Patented Apr. 24, 1928.

1,667,226

UNITED STATES PATENT OFFICE.

ALFRED THAUSS, OF COLOGNE-DEUTZ, GUSTAV MAUTHE, OF COLOGNE-MUHLHEIM, AND ALFRED GÜNTHER, OF COLOGNE-RIEHL, GERMANY, ASSIGNORS TO GRASSELLI DYESTUFF CORPORATION, OF NEW YORK, N. Y., A CORPORATION OF DELAWARE.

PROCESS FOR THE PREPARATION OF SULPHONIC ACIDS OF ARALKYLATED UNSATURATED FATTY ACIDS.

No Drawing. Application filed March 17, 1927, Serial No. 176,300, and in Germany April 24, 1926.

In our application Ser. No. 156,266, filed December 21, 1926, we have described a process for the preparation of aralkylated unsaturated fatty acids and the sulphonic acids thereof. The process described in said application consists in reacting an unsaturated fatty acid with an aralkyl halogenide preferably in the presence of a catalyst and treating the resulting aralkylated unsaturated fatty acid product with a sulphonating agent to produce the corresponding sulphonic acid product.

It has now been found that similar results may be obtained by using the glycerides of the unsaturated fatty acids, i. e., the fats, instead of the free fatty acids.

Examples.

A mixture of 35.6 parts by weight of rape seed oil, 12.6 parts by weight of benzyl chlorid and 0.5 parts by weight of zinc chlorid are heated for 5 hours at 170° C. and then for 3 hours at 180–190° C. The result is a viscous oil. 25 parts by weight of this oil is mixed with 37 parts by weight of sulphuric acid monohydrate and to the resulting mixture while it is maintained at between 5 and 10° C. there are added 48 parts by weight of a mixture of 31 parts by weight of sulphuric acid monohydrate and 17 parts by weight of chlorosulphonic acid, the latter mixture being introduced gradually under agitation. The resulting reaction mixture is treated with sufficient ice to bring about a separation thereof into two liquid layers. The lower layer consisting of an aqueous solution of sulphuric acid is drawn off and the upper layer, a thick oil, is dissolved in 50 parts by weight of water and the solution is exactly neutralized with caustic soda. By salting out and drying at 90° C. one obtains a slightly yellowish powder which is soluble in water. The aqueous solution does not give any precipitate upon the addition of acetic acid. The product in acid solution has gelatin precipitating properties.

We claim:

1. Process which comprises reacting an aralkyl halogenide with a glyceride of an unsaturated fatty acid and sulphonating the product.

2. Process which comprises reacting an aralkyl halogenide with a fat comprising an unsaturated fatty acid in the presence of a catalyst for the reaction, and sulphonating the resulting aralkyl substituted unsaturated fatty acid compound.

3. Process which comprises heating a mixture of benzyl chloride, rape seed oil and zinc chloride for several hours to a temperature from 170 to 190° C., and sulphonating the resulting oil.

4. As a new product, the sulphonic acid compound of an aralkylated derivative of a fat of an unsaturated fatty acid.

5. As a new product, the sulphonic acid compound of a benzylated fat of an unsaturated fatty acid.

In testimony whereof we affix our signatures.

ALFRED THAUSS.
GUSTAV MAUTHE.
ALFRED GÜNTHER.